United States Patent
Rice

[15] 3,683,600
[45] Aug. 15, 1972

[54] FILTER APPARATUS TO PROTECT A SWITCH CHAMBER AGAINST MOISTURE

[72] Inventor: Patricia A. Rice, North Olmsted, Ohio

[73] Assignee: The American Crucible Products Company, Lorain, Ohio

[22] Filed: June 3, 1970

[21] Appl. No.: 43,161

[52] U.S. Cl. .......................55/385, 55/158, 55/183, 55/321, 417/44
[51] Int. Cl. .............................................B01d 50/00
[58] Field of Search ...55/385, 158, 183, 321; 417/44

[56] References Cited
UNITED STATES PATENTS
2,976,950   3/1961   Smith ............................55/30

Primary Examiner—Arthur D. Kellogg
Attorney—Bosworth, Sessions, Herrstrom & Cain

[57] ABSTRACT

The combination of a submersible sump pump, and the like, having a switch chamber with a breather tube extending therefrom and means for preventing moisture and water vapor from passing into the switch chamber through the breather tube as well as such means including a separable hollow body with inlet and outlet ports separated by means which is permeable to air, but not to moisture and water vapor.

5 Claims, 5 Drawing Figures

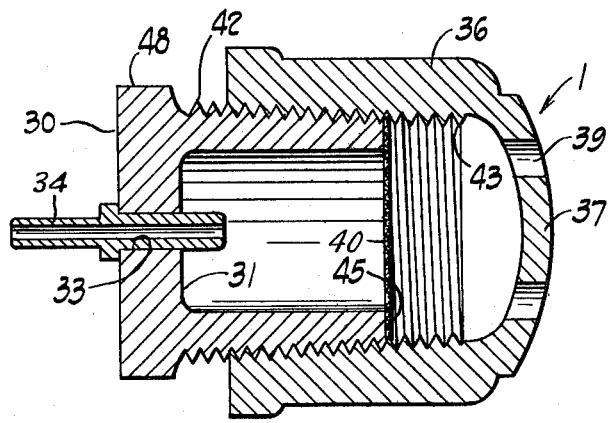
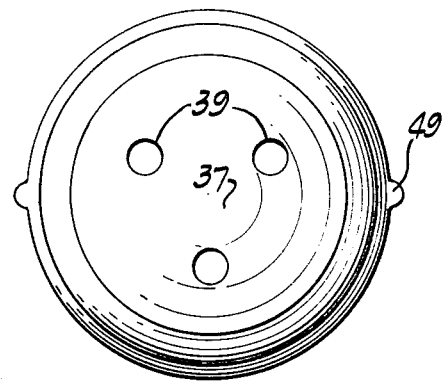
Fig. I  Fig. 2
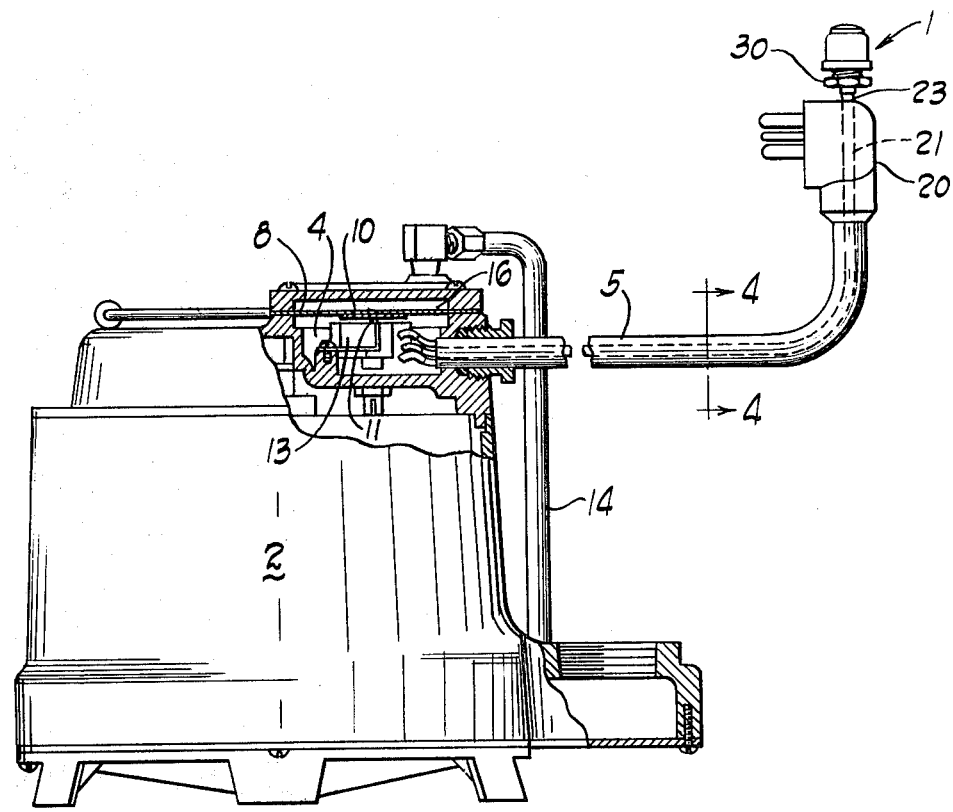
Fig. 3
INVENTOR.
PATRICIA A. RICE
BY Bosworth, Sessions
Herrstrom & Cain
ATTORNEYS Patented Aug. 15, 1972  3,683,600

INVENTOR.
PATRICIA A. RICE
BY Bosworth Sessions
Herrstrom & Cain
ATTORNEYS.

FILTER APPARATUS TO PROTECT A SWITCH CHAMBER AGAINST MOISTURE

BACKGROUND OF THE INVENTION

Field of the Invention

This invention relates to submersible pumps and, more particularly, to means to protect the switch chamber of submersible pumps having breather tubes from moisture and water vapor and to the combination of such means with such a submersible pump.

SUMMARY OF THE INVENTION

The general object of this invention is to provide means for protecting the switch chamber of a submersible pump having a breather tube against entry of moisture, water vapor, and the like.

Another object of this invention is to provide means for protecting the switch chamber of a submersible pump having a breather tube against entry of moisture, water vapor, and the like, which is economically manufactured and used; which is of simple construction; which does not otherwise affect the action of the breather tube in equalizing pressure within the switch chamber; which may be used with breather tubes which are disposed within the electrical cord or conduit leading to the switch chamber; which may be used with breather tubes including means for selectively and manually temporarily reducing the pressure within the switch chamber in order to actuate a pressure responsive switch disposed thereon; which comprises a filter having a member permeable to air, but not to moisture of water vapor; and which includes a filter medium for preventing entry of moisture and water vapor and includes means whereby such filter medium may be selectively replaced as needed.

A still further object of this invention is to provide a means for protecting the switch and electrical connections in the switch chamber of a submersible pump having a breather tube in combination with the pump to be protected thereby and to provide such a means for protecting the switch chamber of a submersible pump control having a breather tube as well as such means in combination with such a control.

Still another object of this invention is to provide a means for protecting the switch chamber of a submersible pump and/or a control therefor having a breather tube obtaining one or more of the objects and advantages set forth above.

These and other objects and advantages of this invention will become apparent from the following description of preferred forms thereof, reference being had to the drawing.

BRIEF DESCRIPTION OF THE DRAWING

FIG. 1 is a longitudinal sectional view of apparatus embodying a preferred form of this invention.

FIG. 2 is an end view of the apparatus shown in FIG. 1.

FIG. 3 is an elevation, on a reduced scale, of the apparatus shown in FIG. 1 together with a breather type cord, control and pump, partly in section and partly in elevation, with which it is used.

DESCRIPTION OF THE PREFERRED EMBODIMENTS

Figure 4:
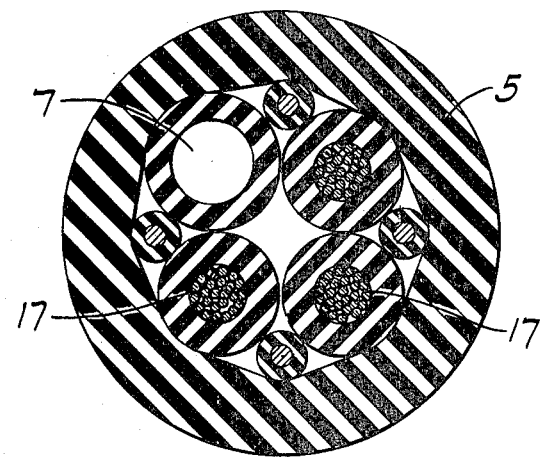
FIG. 4 is a sectional view, on an enlarged scale, of the breather type cord, taken along the line 4—4 of FIG. 3.
Figure 5:
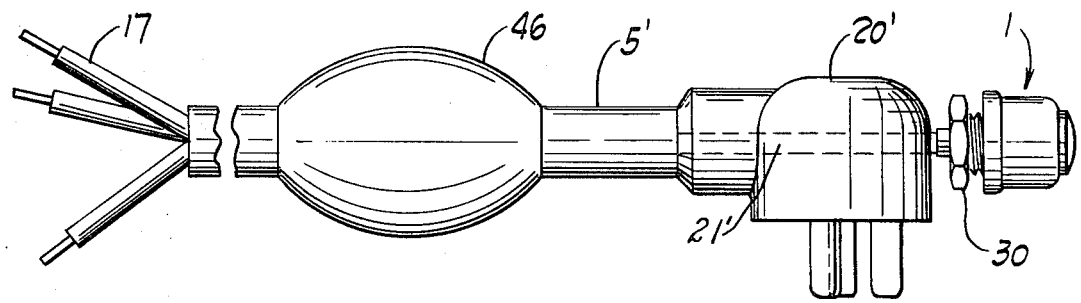
FIG. 5 is an elevation of the apparatus shown in FIG. 1 in use, by way of example, with a different type of breather type cord.

Apparatus embodying a preferred form of this invention is indicated generally at 1, FIGS. 1, 3 and 5. Apparatus 1 is shown in FIG. 3 together with a submersible pump 2 having a switch chamber 4 and breather type cord 5 including a breather tube 7, FIG. 4, with which it is particularly adapted for use.

The pump 2 is a pressure responsive pump adapted to actuate in response to the static pressure of a predetermined depth of liquid to be pumped and to deactuate in response to a changed pressure condition such as, in this instance, a reduction in the depth of the liquid to be pumped. Thus, a part of the wall of the switch chamber 4 is formed or closed by a pressure responsive diaphragm 8 having a plate 10 thereon which engages and operates a button 11 of a switch 13, disposed within the switch chamber 4. Tube 14 communicates the pressure adjacent its lower end (not shown) to the space 16 adjacent the outside, relative to the switch chamber, of the diaphragm 8 where it acts upon the diaphragm in the manner described, for example, in U.S. Pat. No. 3,070,021 issued to applicant's assignee.

Further, because the pump 2 may be used at any unknown altitude, and the difference in ambient pressure might otherwise affect the operation of the diaphragm and, therefore, the switch, means is conventionally provided which provides communication between the switch chamber 4 and the atmosphere above the maximum level to which the liquid to be pumped is to rise.

Usually such means comprises a breather tube 7 which is conveniently and conventionally incorporated together with suitable electrical leads or wires 17 within the cord 5 which is used to conduct electricity from the usual electrical outlet via a conventional electrical plug 20 to the posts, or the like, on the switch 13 in the switch chamber 4.

In such instances, a passageway 21 in the plug 20 having an outlet 23 provides communication between the breather tube 7 and the atmosphere. See, for example, U.S. Pat. No. 3,070,021 referred to above.

All of the above is old in the art and, per se, forms no part of the present invention.

Difficulty has been experienced, however, with submersible pumps having such switch chambers and breather tubes because the atmosphere at or near the places where such pumps are used is frequently, if not usually, quite damp and humid with the result that the natural flow of air into and out from the switch chamber, as the atmospheric pressure rises and falls, as well as the natural flow of the humidity in the air to and through the breather tube inducts moisture and water vapor into the switch chamber with a consequent corrosion or attack on the exposed electrical conductors and posts and the switch, itself, and interference with the normal electrical function thereof, as by short-circuiting and other phenomena.

The apparatus 1 provides means for preventing moisture or water vapor from flowing into the breather tube 7 and thence into the switch chamber 4 and thus protects all of the electrical parts, including the switch, from the deleterious effects thereof, all without interfering with the normal function of the breather tube to equalize pressure between the switch chamber and the surrounding atmosphere.

To this end apparatus 1 comprises filter means which is adapted to cover or control the opening into the breather tube and which is permeable to air and pressure, but not to moisture and water vapor, and thus makes and provides an effective barrier against moisture and water vapor entering into the breather tube and thence the switch chamber.

More particularly, as best seen in FIGS. 1 and 2, apparatus 1 comprises a base member 30 which, preferably, is generally cylindrical in shape and is closed at one end by a wall 31 having a central aperture 33 within which a suitable conduit or fitting, such as nipple 34, is disposed.

Apparatus 1 also includes a cap member 36 which, preferably, is also generally cylindrical in shape and has an end wall 37 having one or more apertures 39 providing communication with the atmosphere.

As shown, base member 30 and end cap 36 have integral cylindrical side walls and end walls 31 and 37, respectively, but the end walls may be formed separately and joined with their respective side walls in any conventional way, if desired.

Base member 30 and end cap 36 are adapted to hold and position a suitable filter 40 intermediate the apertures 33 and 39 so that no air, moisture, water vapor, or the like, can enter the apparatus 1 through the apertures 39 and pass out through aperture 33, or nipple 34 without being subject to the action of filter 40.

Filter 40 is permeable to air and pressure, but not to moisture and water and conveniently comprises or includes a membrane of demethyl silicone or a polyvinyl chloride coated nonwoven fibrous polyester sheet, or the like.

Further, in order to support filter 40 in an efficient and convenient way, it is preferred that base member 30 be threaded externally, as at 42, and end cap 36 be complementarily threaded internally, as at 43, to the end that the end 45 of the base member 30 may be forced to form a seat for the filter which is of such a diameter to overlie the seat or surface and is conveniently held in position as by gluing to the surface. Obviously, the base member could be threaded internally and the end cap externally to the same function and result.

Nipple 34 is provided with an external diameter of sufficient size to fit within and have a tight sealing engagement with the aperture or opening in the end of the breather tube or in communication with the breather tube, as the passage 21 of plug 20, FIG. 3, so that all air flow through the breather tube into and from the switch chamber 4 must pass through the filter or membrane 40 which is impermeable to moisture and water vapor and, therefore, prevents entry thereof from the atmosphere into the switch chamber.

FIG. 5 shows the use of apparatus 1 embodying this invention with a breather type cord 5' effective for manually and selectively actuating an otherwise pressure responsive pump by selectively and artificially reducing the pressure within the switch chamber 4 so as to cause the diaphragm to displace and actuate the switch. Cords 5' include a bulb portion 46 and is, by way of example, of the same type disclosed in FIG. 4 of U.S. Pat. No. 2,933,570 assigned to applicant's assignee. Apparatus 1 is disposed in the opening of the passage 21' in the plug 20' in the same manner as said apparatus is mounted in plug 20 and the operator need only properly cover and control the aperture or apertures 39 in the end cap 36 to use the bulb in the manner taught in said U.S. Pat. No. 2,933,570 to actuate the pump.

Also, one or both of the base member 30 and end cap 36 of apparatus 1 may be provided with external squared or flattened portions 48 or ears 49, respectively, to facilitate assembly and disassembly (tightening and loosening) of the said base member and end cap.

Modifications, changes and improvements to the forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. In a submersible pump having a switch chamber, pressure operated switch means in the switch chamber and a breather tube for communicating between said switch chamber and the atmosphere adjacent said pump, the improvement which comprises a filter housing having a first opening connected to said breather tube and a second opening communicating with the atmosphere, and a filter membrane supported within said housing between said first and second openings, said filter membrane being permeable to air and impermeable to moisture and water vapor, whereby said switch chamber is vented to atmosphere while being maintained free of atmospheric moisture.

2. The improvement according to claim 1 with fitting means disposed in said first opening for interconnection with the breather tube to provide communication between said breather tube and filter membrane.

3. The improvement according to claim 2 in which said housing comprises first and second members, each said member has an end wall, lateral sides, an open end and a hollow interior, one said member is threaded internally and the other is threaded externally, said other member has a flat surface surrounding said open end, said membrane is held against said flat surface and covers said open end into the interior of said other member, and first and second openings are provided in said end walls of said first and second members, respectively.

4. The improvement according to claim 3 in which said flat surface is transverse of said other member and said membrane is glued thereto.

5. The improvement according to claim 3 in which said first member is threaded internally.

* * * * *